May 5, 1964 R. P. ROHDE ETAL 3,131,640
WINDSHIELD CLEANING SYSTEM
Filed Jan. 15, 1963 2 Sheets-Sheet 1
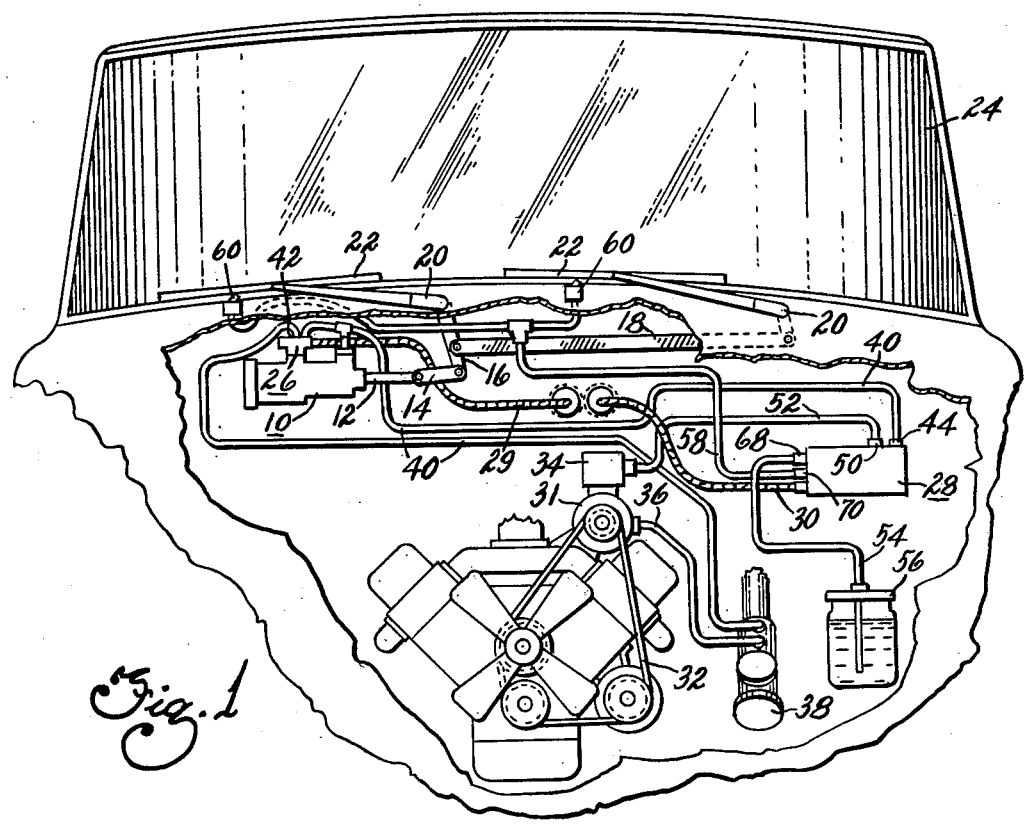
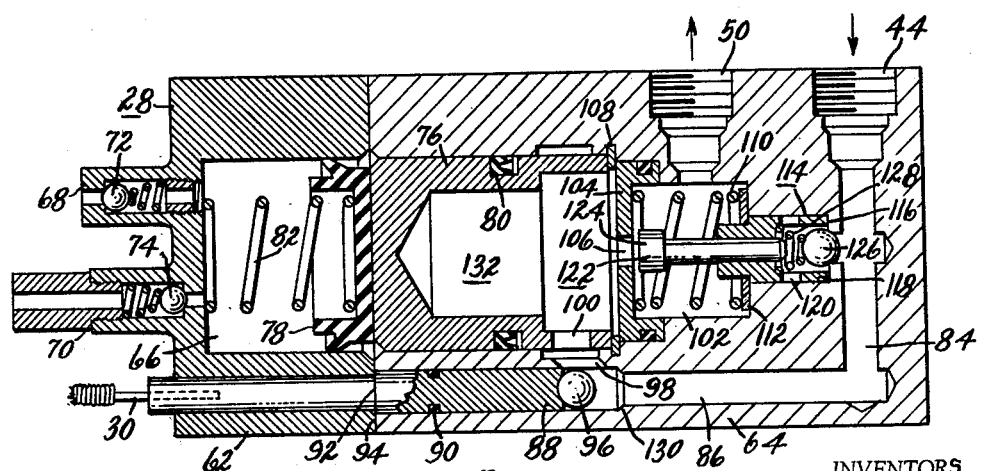
INVENTORS
ROBERT P. ROHDE
JACOB G. STONER
BY
*W. E. Finker*
THEIR ATTORNEY

INVENTORS
ROBERT P. ROHDE
JACOB G. STONER
BY
THEIR ATTORNEY

United States Patent Office 3,131,640
Patented May 5, 1964

3,131,640
WINDSHIELD CLEANING SYSTEM
Robert P. Rohde and Jacob G. Stoner, Saginaw, Mich., assignors to General Motors Corporation, Detroit, Mich., a corporation of Delaware
Filed Jan. 15, 1963, Ser. No. 251,594
13 Claims. (Cl. 103—52)

This invention pertains to windshield cleaning systems, and particularly to a washer unit for discharging liquid solvent onto a windshield into the paths of wiper blades movable thereacross.

At the present time some motor vehicles are equipped with hydraulically actuated wiper units which utilize hydraulic fluid under pressure from an open center hydraulic system such as that used for power steering of the vehicle. The present invention relates to a hydraulically actuated washer unit which can be operated off the return conduit of an open center hydraulic system including a timing valve which automatically returns to an open center position upon completion of the washing cycle.

Accordingly, among our objects are the provision of a windshield cleaning system including a hydraulically actuated washer unit adapted for use with an open center hydraulic system; the further provision of a hydraulically actuated washer unit including timing means for automatically returning the washer unit to an open center position at the completion of the washing cycle; the further provision of a hydraulically actuated washer unit including a timing valve for controlling the duration of the wash cycle, which timing valve also functions as a relief valve; and the still further provision of a hydraulically actuated washer unit including a control for manually initiating a washing cycle and power means for automatically returning the manual control to the "off" position after a washing cycle has been initiated.

The aforementioned and other objects are accomplished in the present invention by embodying a timer controlled valve in the washer unit for controlling the duration of the wash cycle in combination with a momentarily operable manual control for initiating an automatic washing cycle. Specifically, the washer unit includes a piston-type pump having a spring actuated intake stroke and a hydraulically actuated delivery stroke. When the manual control is in the "off" position, hydraulic fluid is free to circulate through the timer valve between the pressure and drain ports of the washer unit. Upon momentary closure of the manual control, the combined timer and relief valve is closed by hydraulic fluid under pressure such that upon release of the manual control the washer pump will be hydraulically actuated throughout its delivery stroke by hydraulic fluid under pressure, and thereafter retracted by the spring to recharge the pump and restore unimpeded circulation of hydraulic fluid between the pressure and drain ports of the washer unit.

Further objects and advantages of the present invention will be apparent from the following description, reference being had to the accompanying drawings, wherein a preferred embodiment of the present invention is clearly shown, and wherein similar numerals depict similar parts throughout the several views.

In the drawings:

FIGURE 1 is a fragmentary view with certain parts broken away, depicting a vehicle windshield cleaning system embodying the washer unit of the present invention.

FIGURE 2 is a longitudinal sectional view of the washer unit shown in the "off" position.

Figure 3:
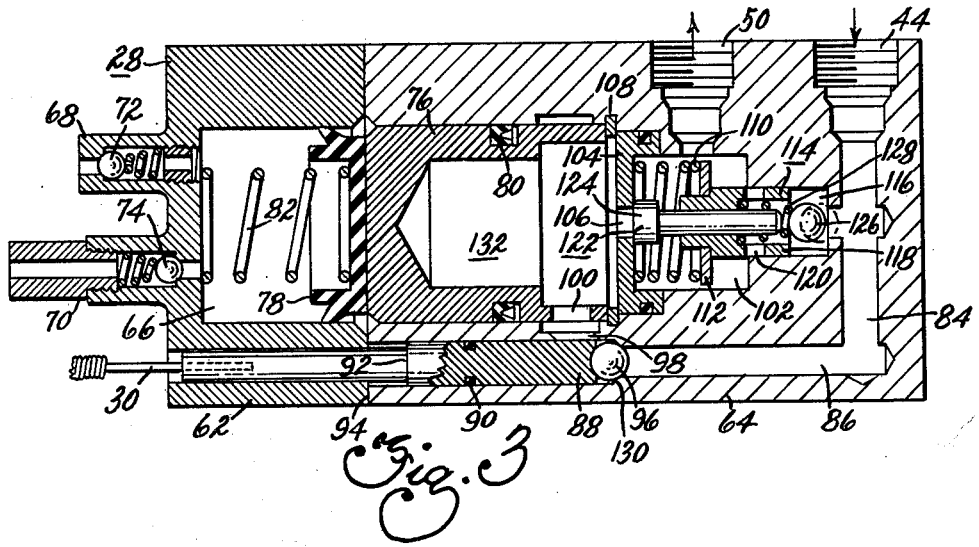
FIGURE 3 is a view similar to FIGURE 2 with the manual control in the "on" position.

Referring to FIGURE 1, the windshield cleaning system of the present invention may include a hydraulic wiper motor 10 of the type disclosed in copending application Serial No. 244,046 filed December 11, 1962, in the name of Rohde et al. and assigned to the assignee of the present invnetion. The wiper motor 10 includes a reciprocable rod 12 connected by a link 14 to a drive arm 16 attached to a wiper arm pivot shaft, not shown. The drive arm 16 is connected by a link 18 to the drive arm of a second wiper pivot shaft, not shown. Wiper arms 20 are drivingly connected to the spaced pivot shafts and carry wiper blades 22 for simultaneous oscillation in phase, or in tandem, across the outer surface of the vehicle windshield 24.

The wiper motor 10 includes a manual control valve 26 connected by a Bowden wire 29 to the instrument panel mounted control. A washer unit 28, constructed according to the present invention, is likewise connected to an instrument panel mounted control through a second Bowden wire 30. If desired, the wiper unit control and the washer unit control may be coordinated for conjoint operation in accordance with the teachings of Ziegler Patent No. 2,905,962, in which case the washer control comprises a depressible button and the wiper control comprises a coaxial rotatable knob, the button having one way driving connection with the knob so as to automatically activate the wiper motor through its manual control valve 26 conjointly with initiating an automatic washing cycle. The washer unit 28, as will be described more particularly hereinafter, is automatically arrested after completion of its delivery stroke while the wiper unit 10 continues to operate until it is manually shut off.

Both the wiper unit and the washer unit operate off the return conduit of an open center hydraulic system which includes a power steering, or accessory, pump 31 driven through a belt 32 from the vehicle engine. The pump 31 includes a reservoir 34 from which it draws fluid and delivers the same under pressure to a pressure conduit 36. The pressure conduit 36 connects with an open center power steering valve 38 from which the hydraulic fluid flows to a return conduit 40. The return conduit 40 is serially connected to a pressure port 42 of the manual control valve 26 of the wiper unit 10 and a pressure port 44 of the washer unit 28. The washer unit includes a drain port 50 connected to a drain conduit 52 which communicates with the reservoir 34. The control valves for the wiper motor 10 and the washer unit 28, as well as the power steering control valve 38 are all of the open center type whereby hydraulic fluid is permitted to freely circulate when the valves are in "neutral" or "off" positions.

The washer unit 28 is connected by a conduit 54 to a reservoir 56 containing liquid solvent, and a delivery conduit 58 which communicates with spaced nozzles 60 for spraying liquid solvent onto predesignated areas of the windshield 24 in the paths of movement of the wiper blades thereacross. Referring to FIGURES 2 through 5, the washer unit 28 comprises a housing having parts 62 and 64 which are connected in any suitable manner. Housing part 62 contains a pump cavity, or chamber, 66 having an inlet fitting 68 and a delivery fitting 70. The inlet fitting contains a one-way spring biased inlet check valve 72 that is adapted to be connected to the conduit 54. The delivery fitting 70 contains a one-way spring biased outlet valve 74 and is adapted to be connected to the delivery conduit 58.

A reciprocable motor piston 76 is mounted in a bore of the housing part 64 coaxial with the pump cavity 66. The motor piston 76 carries a pump piston 78 having a lip-type seal which is always disposed in the pump cavity 66, and the body of the motor piston 76 carries a seal ring 80 which engages the bore of the housing part 64. The seal 80 prevents the passage of hydraulic fluid into the pump cavity 66, and the lip seal on the pump piston 78 precludes the flow of liquid solvent from the pump cavity 66 to the bore of the housing part 64. As shown, the pistons 76 and 78 are biased to the right by a coil spring 82, which spring effects the intake stroke of the pump in a manner to be described.

The pressure port 44 connects with housing passages 84 and 86. A reciprocable plunger 88 is disposed in the passage 86, the plunger carrying a seal ring 90 for preventing the leakage of hydraulic fluid therefrom and having a shoulder 92 which, in the "off" position, engages a complementary shoulder 94 on the housing part 62. A ball valve 96 is normally held in engagement with the inner end of the plunger 88 by the hydraulic fluid under pressure flowing through the port 44, the passages 84 and 86 and a port 98 that registers with a port 100 in the skirt of the piston 76. The plunger and the ball valve 96 constitute the manual control, operation of which will be described hereinafter, and as shown, the plunger is connected to a Bowden control wire 30.

The drain port 50 communicates with a housing chamber 102 having a retainer plate 104 at one end thereof with a centrally located port 106, the retainer being held in assembled relation with the housing by a snap ring 108. A coil spring 110 is disposed between the retainer 104 and a thrust washer 112 which engages a hollow plunger 114 mounted for reciprocation in a stepped bore 116 of the housing. The plunger 114 is formed with a skirt 118 having a plurality of circumferentially spaced side wall ports 120, and supports a second reciprocable plunger 122. The plunger 122 includes a head portion 124 adapted to close the port 106 in the retainer 104, the plunger 122 constituting a combined timing and relief valve as will be pointed out more particularly hereinafter.

The bore 116 is interconnected with the passage 84, but communication is normally blocked therebetween by a ball valve 126 biased by a spring 128. With the manual control plunger 88 in the position shown in FIGURE 2, hydraulic fluid under pressure from the return conduit 52 can circulate freely through the washer unit through port 44, passages 84 and 86, ports 98 and 100, port 106, the chamber 102 and the drain port 50.

To initiate an automatic wash cycle, the manual plunger 88 is actuated through the Bowden control wire 30 by pushing the same inwardly so that the ball 96 engages valve seat 130 and the passage 86. When the ball valve 96 engages its seat 130, circulation of hydraulic fluid under pressure through the washer unit is blocked, thus causing the pressure to build up so as to unseat ball valve 126. When ball valve 126 is unseated, the pressure increases in the bore 116 so as to move the plunger 114 from the position of FIGURE 2 to the position of FIGURE 3 whereat the head 124 of the plunger 122 closes the port 106, and the plunger 114 compresses the spring 110 through the thrust washer 112. The load and rate of spring 110 are such that when the side wall ports 120 in the plunger 114 communicate with the chamber 102, the pressure build up is slightly higher than the relief valve setting, and therefore also higher than the normal operating pressure for the washer unit. As long as the manual control plunger 88 is held in the position of FIGURE 3, the ball valve 126 will remain in its full line position of FIGURE 3 such that oil will again be free to circulate from the pressure port 44 to the drain port 50 through passage 84, the bore 116, ports 120 and the chamber 102.

Figure 4:
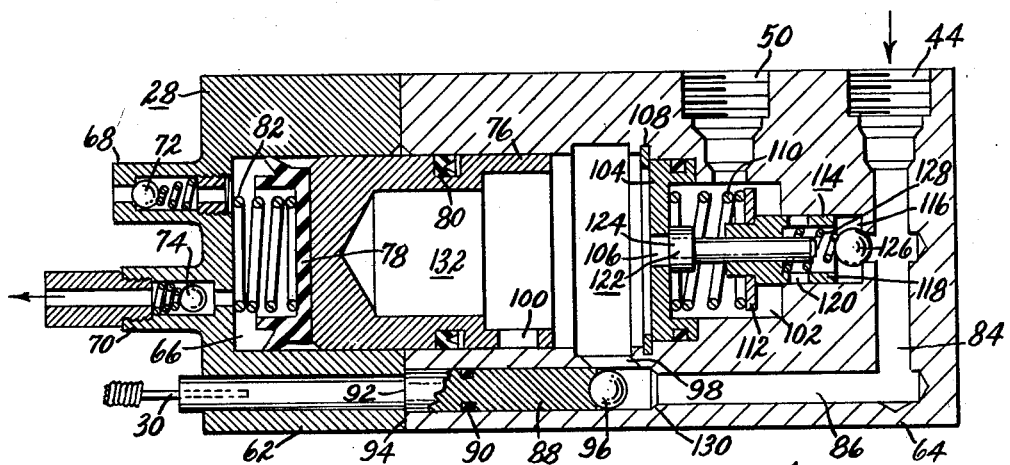
FIGURE 4 is a view similar to FIGURE 3 with the manual control released and the washer pump piston effecting its delivery stroke.
Figure 5:
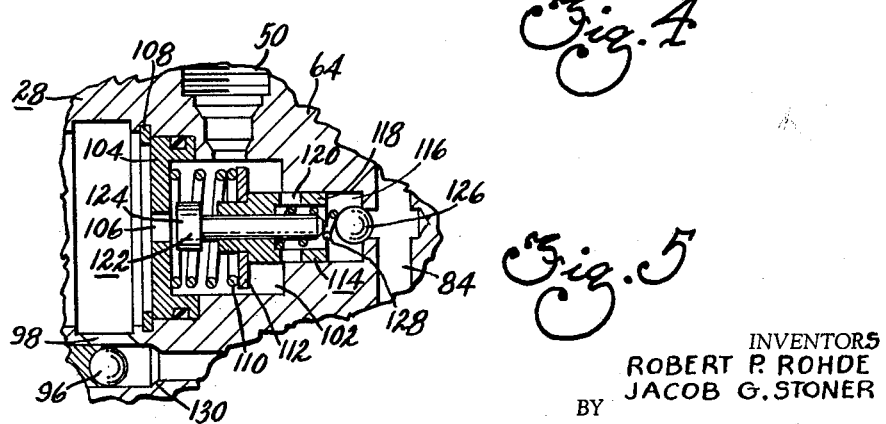
FIGURE 5 is a fragmentary sectional view depicting operation of the timer valve in relieving excess pressure in the washer unit.

When the manual control plunger 88 is released through the Bowden wire 30, the pressurized oil acting on the full area of the ball 96 and the plunger 88 will retract the plunger 88 to the position shown in FIGURES 2 and 4. Concurrently with release of the manual control plunger 88, the ball valve 126 will reseat under the urge of spring 128 thereby blocking communication between passage 84 and bore 116, and the plunger 114 will return to a position where ports 120 are blocked, as shown in FIGURE 4. Since the hydraulic fluid cannot now flow to the return line through bore 116, it flows through ports 98 and 100 into piston cavity, or motor chamber, 132 thereby moving piston 76 to the left against the force of spring 82 to effect the delivery stroke of the pump piston 78. Accordingly, liquid solvent will be discharged under pressure through conduit 58 and the nozzles 60. If the pressure in the piston cavity 132 exceeds the predetermined relief valve setting, as determined by the calibrated spring 110, the head 124 of the plunger 122 will open the port 106, as shown in FIGURE 5, due to movement of the plunger 122 to the right. Movement of the plunger 122 to the right, as seen in FIGURE 5, is accomplished by movement of the plunger 114 to the left by virtue of the hydraulic fluid trapped in the bore 116 between the plungers 122 and 114 and the ball valve 126 until the ports 120 again communicate with the chamber 102 whereat the excess hydraulic fluid trapped in the bore 116 will bleed out into the chamber 102. The excess pressure in the cavity 132 will be relieved through port 106, chamber 102 and drain port 50. It was mentioned previously that the pressure to move plunger 114 to the left is higher than the relief pressure. Now that the operation of the relief valve has been described, it becomes obvious that the larger area of the port 106, as compared to the diameter of the plunger 122, accounts for the fact that relief pressure is lower than the pressure to move plunger 114 to the left.

The plunger 122 also constitutes a timing valve for automatically controlling the washing cycle. Thus, when the pump piston 78 completes its delivery stroke, pressure will build up in cavity 132 so as to open the relief valve comprising the plunger head 124 and the port 106, until the trapped fluid within the bore 116 between plungers 122, 114 and the ball valve 126 is bled out into the chamber 102 through the ports 120. Thereafter, free flow is again established between the pressure port 44 and the drain port through the passages 84, 86, ports 98 and 106, and the chamber 102, thus permitting the power spring 82, in which energy is stored during the delivery stroke of the pump piston 78, to retract the pistons 76 and 78 to complete the intake stroke of the pump.

It is to be noted that the improved washer unit of the present invention will not malfunction if the washer nozzles 60 are clogged for any reason. Under these conditions, the pump piston 78, of course, cannot complete its delivery stroke and pressure will be built up in the piston cavity 132 so as to open the relief valve until the trapped oil in the bore 116 between the plunger 114, 122 and the ball valve 126 is bled into the chamber 102 thereby establishing free circulation between the pressure and drain ports of the washer unit. Furthermore, the manual control plunger 88 will automatically be power actuated to the "off" position upon release of the Bowden wire control 30 due to the fact that the full area of the plunger 88 is opposed to the pressure in passage 86.

While the embodiment of the invention as herein disclosed constitutes a preferred form, it is to be understood that other forms might be adopted.

What is claimed is as follows:

1. In a windshield cleaning system for spraying liquid solvent onto a predesignated area of a windshield into the path of movement of a wiper blade thereacross comprising, a washer unit including a pump, power means for effecting the intake stroke of the pump, an open center hydraulic system connected to said washer unit, hydraulic pressure actuated means for effecting the delivery stroke of said pump, a manual control valve connected with said hydraulic system, and timing means responsive to momentary closure of said manual control for automatically pressurizing said hydraulically actuated means to effect the delivery stroke of said pump and thereafter reestablish free circulation of hydraulic fluid therethrough so as to permit said power means to effect the intake stroke of said pump.

2. In a hydraulically operated windshield cleaning system comprising, a washer unit including a pump having energy storing means for effecting the intake stroke thereof and hydraulically actuated means for effecting the delivery stroke thereof, an open center hydraulic system connected to said washer unit, a manual control for said washer unit, and timing valve means hydraulically operated upon momentary closure of said manual control for pressurizing said hydraulically actuated means to effect the delivery stroke of said pump and thereafter automatically reestablish free circulation of hydraulic fluid through the washer unit to enable said energy storing means to effect the intake stroke of said pump.

3. A hydraulically operated washer unit including, a housing, a liquid displacing member disposed in said housing and dividing said housing into a pump chamber and a motor chamber, a power spring disposed in said pump chamber for effecting the intake stroke of said member, said housing having a pressure port and a drain port, a manual control valve in said housing having an "off" position wherein hydraulic fluid can circulate freely between said pressure and drain ports through said motor chamber, and automatic valve means disposed in said housing and operable upon momentary closure of said manual control valve for blocking communication between said pressure and drain ports to pressurize said motor chamber to effect the delivery stroke of said member and thereafter automatically reestablish free circulation of hydraulic fluid between the pressure and drain ports to permit said power spring to effect the intake stroke of said member.

4. In a hydraulically operated windshield cleaning system including, a washer unit comprising a pump having power means for effecting the intake stroke thereof and hydraulically actuated means for effecting the delivery stroke thereof, an open center hydraulic system connected with said washer unit, a manual control for said washer unit, hydraulically operated timing valve means actuated upon momentary closure of said manual control for pressurizing said hydraulically actuated means to effect the delivery stroke of said pump and thereafter reestablishing free circulation of hydraulic fluid through the washer unit to enable said power means to effect the intake stroke of said pump, and hydraulically operated means for automatically restoring said manual control to its "off" position upon release thereof.

5. In a hydraulically operated windshield cleaning system including, a washer unit comprising a pump, power means for effecting the intake stroke of the pump, hydraulically actuated means for effecting the delivery stroke of the pump, an open center hydraulic system connected to said washer unit, a manual control for said washer unit, hydraulically operated timing valve means actuated upon momentary closure of said manual control for pressurizing said hydraulically actuated means to effect the delivery stroke of said pump and thereafter automatically reestablish free circulation of hydraulic fluid through the washer unit to enable said power means to effect the intake stroke of said pump, and spring means engaging said timing valve means for relieving excess pressure in said washer unit to control the maximum pressure of said hydraulic system.

6. In a hydraulically operated windshield cleaning system including, an open center hydraulic system including a continuously driven accessory pump for pressurizing hydraulic fluid, said hydraulic fluid system including a return conduit, a washer unit including a pump having a power spring for effecting the intake stroke thereof and hydraulically actuated means for effecting the delivery stroke thereof, means connecting said washer unit with said return conduit, a manual control for said washer unit, and a servo actuated timing valve operable upon momentary closure of said manual control for pressurizing said hydraulically actuated means to effect the delivery stroke of said pump and thereafter automatically reestablish free circulation of hydraulic fluid through the washer unit to enable said power spring to effect the intake stroke of said pump.

7. A hydraulically operated washer unit including, a housing having a pressure port and a drain port, reciprocable piston means disposed in said housing and dividing said housing into a pump chamber and a motor chamber, a power spring disposed in said pump chamber for effecting the intake stroke of said piston means, a manual control valve in said housing having an "off" position wherein hydraulic fluid can circulate freely between said pressure and drain ports through said motor chamber, and a servo actuated timing valve disposed in said housing and operable upon momentary closure of said manual control valve to block communication between said pressure and drain ports to pressurize said motor chamber to effect the delivery stroke of said piston means and thereafter automatically reestablish free circulation between said pressure and drain ports to permit said power spring to effect the intake stroke of said piston means.

8. A hydraulically operated washer unit including, a housing, reciprocable piston means disposed in said housing and dividing said housing into a pump chamber and a motor chamber, a power spring disposed in said pump chamber for effecting the intake stroke of said piston means, said housing having a pressure port and a drain port, a manual control valve in said housing having an "off" position wherein hydraulic fluid can circulate freely between said pressure and drain ports through said motor chamber, and a spring loaded servo actuated timing valve disposed in said housing and actuated upon momentary closure of said manual control valve for blocking communication between said pressure and drain ports to pressurize said motor chamber to effect the delivery stroke of said piston means and thereafter automatically reestablish free circulation of hydraulic fluid between the pressure and drain ports to permit said power spring to effect the intake stroke of said piston means.

9. A hydraulically operated washer unit including, a housing having a pressure port and a drain port, reciprocable piston means disposed in said housing and dividing said housing into a pump chamber and a motor chamber, passage means disposed in said housing and dividing said housing into a pump chamber and a motor chamber, passage means interconnecting said pressure port and said motor chamber, a first manually operable valve in said passage means having an "off" position wherein hydraulic fluid can circulate freely between said pressure and drain ports through said motor chamber, and a second hydraulically operable spring loaded valve disposed between said motor chamber and said drain port for blocking communication therebetween upon momentary closure of said first valve to pressurize said motor chamber and effect the delivery stroke of said piston means, said second valve being responsive to the build-up of pressure in said motor chamber upon completion of the delivery stroke to reestablish communication between said motor chamber and said drain port and permit said power spring to effect the intake stroke of said piston means.

10. The washer unit set forth in claim 9 wherein said second valve is disposed in a valve chamber in said housing and comprises a pair of coaxial reciprocable plungers, and wherein said washer unit includes a spring biased, pressure responsive third valve connected with said passage means for subjecting said plungers to hydraulic fluid under pressure upon closure of said first valve.

11. The washer unit set forth in claim 10 wherein one end of said valve chamber is formed by a plate having a port therein, and wherein one of said plungers has a head for closing said port.

12. The washer unit set forth in claim 11 wherein the other of said plungers is operatively connected with a spring, and wherein hydraulic fluid is trapped between said plungers and said third valve when said first valve is returned to the "off" position whereby said second valve constitutes a relief valve responsive to pressure in the motor chamber as determined by the load on said spring.

13. The washer unit set forth in claim 11 wherein said first valve is hydraulically actuated to the "off" position upon release thereof and comprises a reciprocable plunger disposed in said housing.

References Cited in the file of this patent
UNITED STATES PATENTS

| | | |
|---|---|---|
| 3,025,551 | Oishei et al. | Mar. 20, 1962 |
| 3,075,226 | Deibel et al. | Jan. 29, 1963 |